United States Patent

[11] 3,547,426

[72] Inventors Cullen Payton Hart;
 Vergil P. Hendrickson; James R. Sebern,
 Decatur, Ill.
[21] Appl. No. 756,822
[22] Filed Sept. 3, 1968
[45] Patented Dec. 15, 1970
[73] Assignee Caterpillar Tractor Co.
 Peoria, Ill.
 a corporation of California

[54] CUSHIONING STRUT FOR WHEEL TRACTOR-SCRAPER
 21 Claims, 3 Drawing Figs.
[52] U.S. Cl. .................................................. 267/1,
 280/489
[51] Int. Cl. ..................................................... F16f 7/12

[50] Field of Search ............................................. 267/63,
 138, 141, 152, 153; 280/489, 486

[56] References Cited
 UNITED STATES PATENTS
 3,311,389 3/1967 Barton et al. ................. 280/489
 3,434,708 3/1967 Hawk, Jr. ...................... 267/1(13)

Primary Examiner—James R. Marbert
Attorney—Fryer, Tjensvold, Feix, Phillips & Lempio ABSTRACT: The hitch assembly for a wheel tractor-scraper comprises a parallelogram-type linkage having a combined spring and shock absorbing strut connected thereto to cushion relative movements occurring between the tractor and scraper. The strut comprises a plurality of resilient pads arranged in stacked relationship on a rod reciprocally mounted in a casing of the strut.

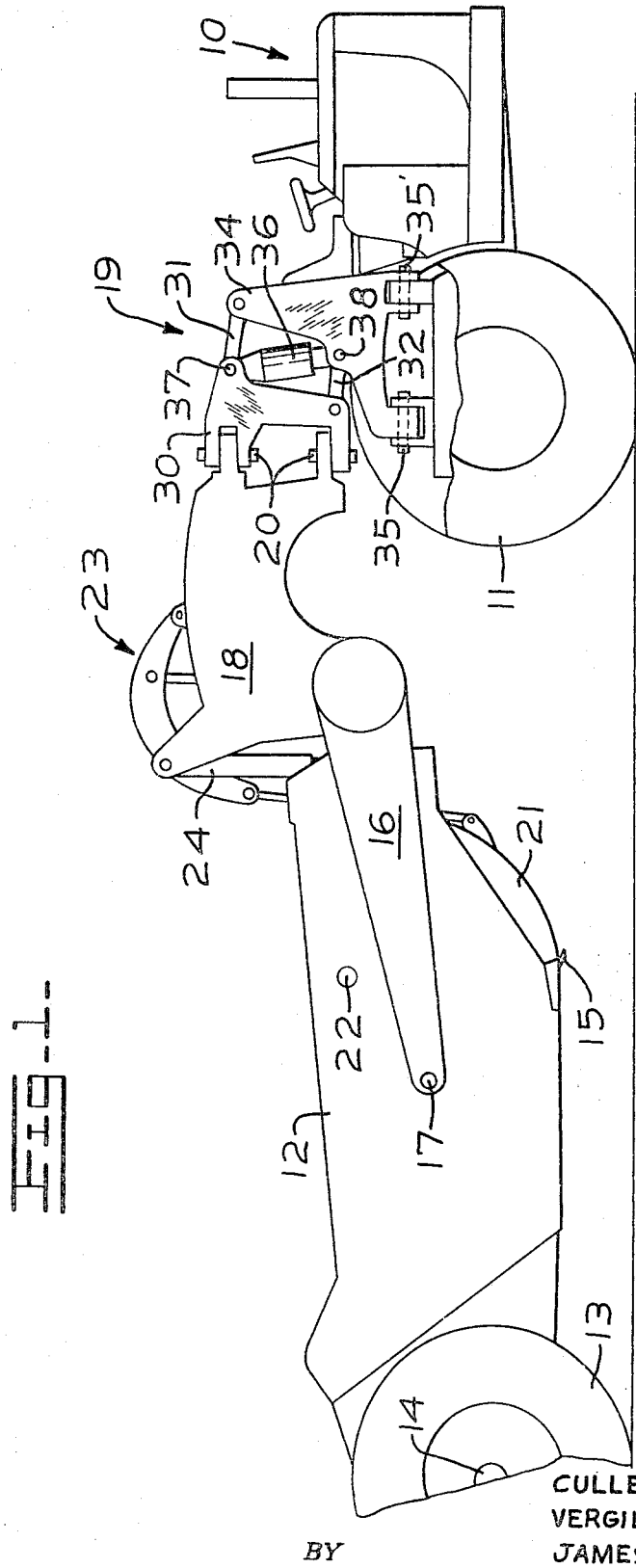

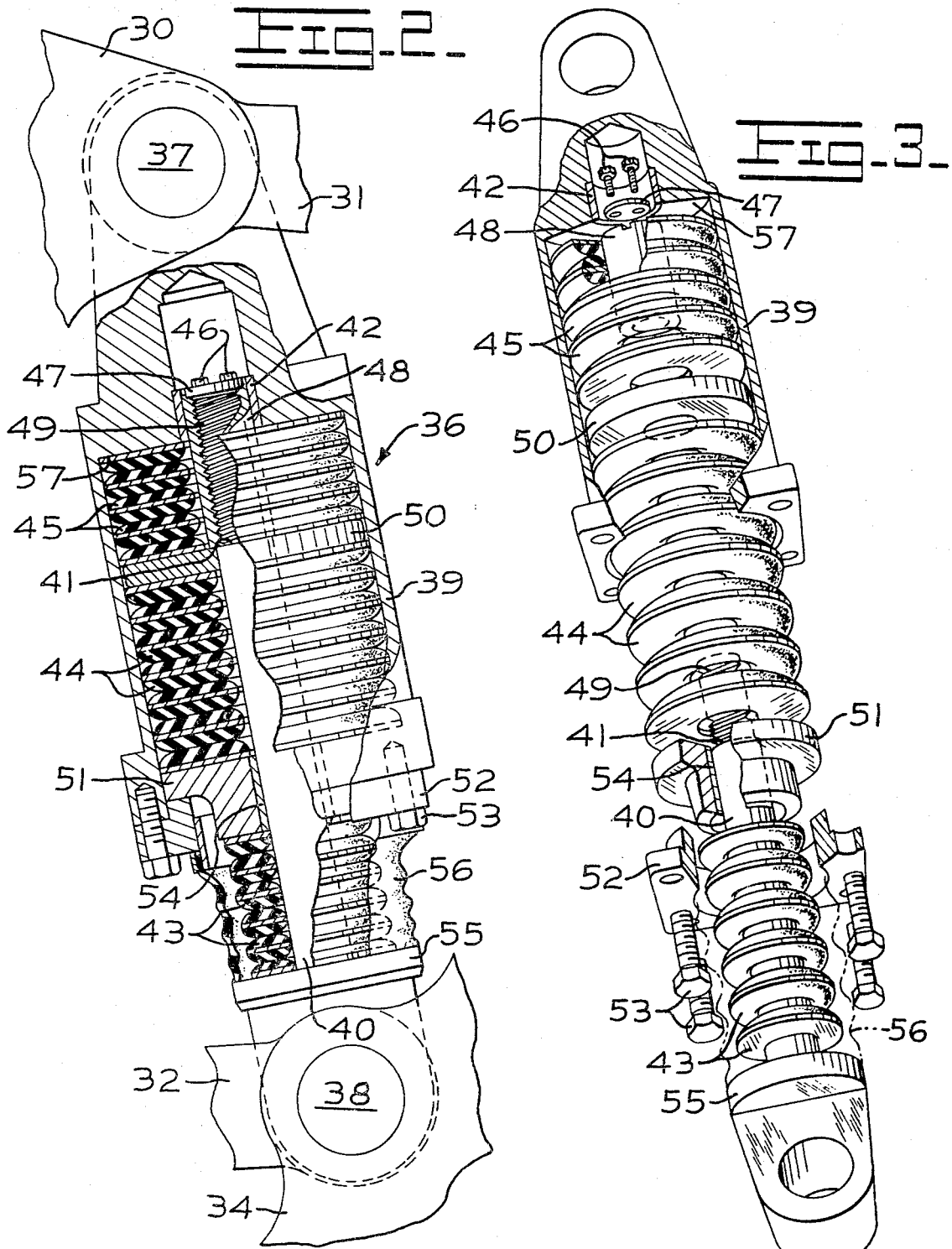

3,547,426

CUSHIONING STRUT FOR WHEEL TRACTOR-SCRAPER

Various spring and shock-absorbing means have been proposed for dampening movements occurring between two members arranged to move relative to each other. For example, such means are normally employed between the axle and body of a motorized vehicle to improve its riding characteristics and to compensate for undue stresses occurring in structural components thereof. Conventional tractor-trailer combinations, such as tractor-scrapers, also dictate the need for such a means to cushion relative movements occurring between the tractor and scraper during various phases of an earth moving operation.

In particular, tire resiliency and the weight of the loaded scraper oftentimes creates intolerable bouncing movements during the hauling phase of operation. In addition to such bouncing the vehicle has a tendency to pitch or rock about the axis of its wheels. Such problems and one solution therefor are more fully described in U.S. Pat. No. 3,311,389, assigned to the assignee of this application.

This invention overcomes many such problems by providing a novel combined spring and shock-absorbing strut for the hitch assembly of a tractor-trailer combination. The strut comprises a plurality of stacked resilient pads having predetermined spring rates adapted to be alternately compressed and at least partially relaxed upon operation of the tractor-trailer to cushion bouncing movements thereof. In addition, the strut, per se, comprises a novel subcombination of this invention wherein the resilient pads are mounted on a rod reciprocally mounted in a casing. Means cooperate with the casing, rod and pads for effecting predetermined collective spring rates with the pads when the rod is reciprocated in both directions relative to the casing.

An object of this invention is to provide a low cost and highly durable strut having a plurality of resilient pads stacked therein, which is adapted for expeditious assembly and disassembly and which efficiently functions as a combined spring and shock absorber to cushion movements occurring between two relatively movable members.

Another object of this invention is to employ such a strut in combination with a ground-engaging vehicle to improve its riding characteristics and to also counteract undue stresses normally occurring in structural components thereof.

A further object of this invention is to employ such a strut in the hitch assembly of a wheel tractor-trailer combination to cushion relative movements occurring between the tractor and trailer during operation thereof.

Further objects of this invention will be understood from the following description and accompanying drawings wherein:

FIG. 1 is a side elevational view of a wheel tractor-scraper combination having the cushioning strut of this invention employed therein.

FIG. 2 is an enlarged, partially sectioned view of such cushioning strut; and

FIG. 3 is a partially exploded, isometric view of the FIG. 2 cushioning strut.

The tractor-trailer illustrated in FIG. 1 comprises a conventional tractor 10 supported by a pair of front ground-engaging wheels 11 (one shown). The trailer may constitute a conventional scraper having a bowl 12 pivotally supported on rear wheels 13 (one shown) by a wheel axle 14. Thus the bowl may be lowered about the axle in a conventional manner from its raised position shown in FIG. 1 to lower a cutting edge 15 thereof into engagement with the ground for bowl filling purposes.

A draft assembly comprises spaced arms 16 (one shown) each pivoted by a stub shaft 17 on a respective side of the bowl. The other end of each arm is rigidly connected to a forwardly extended gooseneck 18. The gooseneck is attached to a hitch assembly 19 by pivot pins 20, the hitch assembly being utilized to operatively connect the tractor and scraper together.

A conventional apron 21 is pivoted to the sides of the bowl by a shaft 22 and may be selectively moved to open or close the front of the bowl by linkage means 23 and suitable power means (not shown) attached thereto. The forward end of the bowl may be raised or lowered by one or more hydraulic cylinders 24 connected between gooseneck 18 and a forward portion of the bowl. Extension of the cylinders will function in a conventional manner to lower the bowl to its scraping position while retraction thereof will function to raise it to the load-carrying position shown.

Hitch assembly 19 comprises a bracket 30 pivotally connected for swivel movements by spaced links 31 and 32 to an A-frame 34 to form a parallelogram-type linkage. The A-frame is pivoted by horizontally disposed pins 35 and 35' to the frame of the tractor. Vertical movements occurring between the tractor and bracket 30 are thus substantially controlled by the parallelogram-type linkage and cushioning means hereinafter described. In particular, it is desirable to provide means for dampening adverse vibrations and bouncing motions encountered by the vehicle during operation thereof.

The above described structures correspond to like numbered structures disclosed in U.S. Pat. No. 3,311,389. Such patent fully describes a hydraulically controlled system for cushioning the bouncing motion occurring in the tractor-scraper during operation thereof. The specific application of this invention, as hereinafter described, contemplates substitution of a cushioning strut 36 in lieu of such rather expensive hydraulic system. However, it should be understood that the cushioning strut of this invention may find many other suitable applications wherein it is desired to cushion relative movements occurring between two members, such as between an axle and body of an automobile or other ground engaging vehicle.

In the preferred application strut 36 is pivoted at its upper end on a shaft 37 (FIGS. 1 and 2) which also pivots link 31 to bracket 30. The lower end of the strut is pivoted on a shaft 38 which also pivots link 32 to A-frame 34. Referring to FIGS. 2 and 3, strut or cushioning means 36 comprises a hollow casing 39 and a coaxial rod 40 inserted into an open end thereof. The rod has a shoulder 41 formed thereon and has its upper end reciprocally mounted in a sleeve bearing 42 secured to the casing.

A first stack of resilient pads 43 are mounted on the lower end of the rod and preferably comprise an annular or donut shape to facilitate such mounting although other suitable shapes could be employed. Second and third stacks of annular compression pads 44 and 45, respectively, preferably have substantially larger diameters (e.g. two times) than pads 43 and are mounted on the upper end of the rod. The three stacks or plurality of pads are sufficiently resilient and have predetermined spring rates to cooperate with each other to effectively dampen dynamic bouncing of the vehicle as will be hereinafter more fully explained.

The resilient and elastic compression pads are well known in the prior art and do not constitute part of this invention per se. For example, reference may be made to prior art teachings such as those disclosed in U.S. Pat Nos. 2,656,182; 2,859,978; 2,960,350; and 3,086,765 for a better understanding of typical resilient pad constructions. Pads 43 and 44 are herein shown as the type comprising a metallic plate or washer having a resilient rubber or plastic cushion bonded to one or both sides thereof.

Bolts 46 secure a lock plate 47 to the upper end of rod 40 to retain a bearing nut 48 thereon. The nut is threadably attached to threads 49 formed on the rod with the lower end of the nut arranged to normally abut shoulder 41. Annular snubber or separating plates 50 and 51 are slidably mounted on the rod to permit the rod to move axially relative thereto and to divide the compression pads into three groups. A retaining plate 52 is secured to the lower end of casing 39 by bolts 53 to normally abut plate 51 upon normal pad relaxation or expansion to retain pads 44 and 45 in a partially compressed or preloaded condition.

A bearing bushing 54 is preferably secured within plate 51 to guide reciprocal movements of rod 40. Thus spaced bearing means 42 and 54 cooperate with each other to assure positive alignment of the rod during movements thereof. The lower of first stack of pads 43 are normally retained in their preloaded or partially compressed condition between plate 51 and a flange 55 formed on the rod. A flexible dust guard 56 is preferably secured to the casing and flange to circumvent pads 43 to protect the inner structures of the strut.

Referring more particularly to FIG. 3, the method of strut assembly preferably occurs in the following manner. Pads 43 and 44 and plates 50 and 51 are mounted on the rod, nut 48 is threaded onto threads 49 of rod 40 to engage shoulder 41 and plate 47 is attached by bolts 46 to retain the nut in position. This compresses and preloads pads 43 and 44 between plates 50, 51 and flange 55 prior to assembly within casing 39. Pads 45 are then placed on nut 48 prior to insertion of the upper end of the rod and bearing nut into sleeve bearing 42. Securing of plate 52 to casing 39 by bolts 53 preloads pads 45, with the final compression and preloading being effected by the machine weight when the strut is mounted on pins 37 and 38.

Pads 43, 44 and 45 comprise predetermined design parameters to provide the desired individual and composite spring rates in cooperation with means comprising surface 57, plates 50 and 51 and flange 55. The pads are preferably preloaded to a partially relaxed condition in the strut and are thus adapted to be further compressed upon relative movements occurring between the rod and casing. In the tractor-scraper hitch application under consideration, a low spring rate for the strut is effected initially by compression of first pads 43. The composite spring rate progressively increases by successive compression of all the pads, including pads 44 and 45, until the maximum pad compression or shock absorbing limit is reached by moving rod 40 fully upwardly (FIG. 2) in a first direction relative to casing 39.

The center group of pads 44 alone function to provide a second composite spring rate to cushion the strut during the rebounding or extension phase of strut operation, i.e., when the rod moves in a second direction opposite to the first direction relative to the casing. In particular, when the rod moves downwardly the lower end of nut 48 will engage plate 50 to move it downwardly to compress pads 44 against plate 51. Precise control of such pads is of particular significance when a downward force is imparted onto bowl 12 (FIG. 1) to engage cutting edge 15 with the ground, for example.

Suitable lubrication means (not shown) may be provided for lubricating pilot bearings 42 and 54 if so desired. Also, suitable roller bearing means or the like (not shown) may be provided between one or more of surface 57, plates 50 and 51 and flange 55 and each pad or pad plate (FIG. 2) abutting therewith. Such bearing means will function to reduce undue torsional stresses occurring in the strut when it is employed in an application wherein rod 40 and casing 39 rotate at least a limited amount relative to each other.

The above described combined spring and shock-absorbing strut provides a number of obvious features and advantages over prior art structures. For example, the strut is inexpensive to manufacture and can be assembled and disassembled expeditiously for servicing or like purposes. In addition, the strut's composite spring rate may be accurately predetermined and changed by merely varying the physical size or properties of the pads and/or by selectively positioning them in the strut.

As suggested above, FIG. 2 illustrates an embodiment wherein such composite spring rate progressively varies during upward movement of rod 40. Such a variable spring rate may also be utilized when the rod moves downwardly. It should be further noted that spaced bearings 42 and 54 assure positive alignment of the rod and assure maximum strut service life by minimizing friction normally occurring in conventional suspension systems wherein appreciable metal-to-metal contact is encountered.

We claim:

1. A combined spring and shock absorbing strut comprising a hollow casing, a rod coaxially and reciprocally mounted in said casing, a plurality of stacked resilient pads, having predetermined spring rates and divided into at least two groups, mounted on said rod to be selectively compressed and at least partially relaxed upon relative coaxial movements occurring between said casing and rod, and means cooperating with said casing, rod and pads for compressing and effecting a first predetermined composite spring rate with at least a first group of said pads when said casing and rod are moved coaxially relative to each other in a first direction and for compressing and effecting a second predetermined composite rebound spring rate with at least a second group of said pads when said casing and rod are moved coaxially relative to each other in a second direction opposite to said first direction.

2. The invention of claim 1 wherein said means cooperates with said casing, rod and pads to compress a greater number of pads when said casing and rod are moved relative to each other in said first direction than when said casing and rod are moved relative to each other in said second direction.

3. The invention of claim 1 wherein said pads exhibit a progressively variable spring rate when said casing and rod are moved relative to each other in said first direction.

4. The invention of claim 1 wherein said pads are normally partially compressed and preloaded a predetermined amount by said means, casing and rod.

5. The invention of claim 2 wherein said pads are divided by a separating plate slidably mounted on said rod into at least first and second stacks defining said first and second groups, both said first and second stacks being compressed when said casing and rod are moved relative to each other in said first direction and only said second stack being compressed when said casing and rod are moved relative to each other in said second direction.

6. The invention of claim 5 further comprising a retaining plate attached to said casing to abut said separating plate when said pads are in their normally expanded condition.

7. The invention of claim 5 wherein said pads have an annular configuration, the pads of said first stack having diameters substantially less than the diameters of the pads of said second stack.

8. The invention of claim 5 wherein said rod has a flange secured thereto, said first stack of pads mounted on said rod to abut said flange.

9. The invention of claim 5 wherein said pads further comprise a third stack separated from said second stack by a second separating plate slidably mounted on said rod.

10. The invention of claim 1 further comprising spaced bearing means cooperating with said housing and rod to maintain them in axial alignment when they are moved axially relative to each other.

11. The invention of claim 6 further comprising a bearing nut attached to an end of said rod, said bearing means comprising a sleeve bearing attached to said housing and slidably receiving said bearing nut therein.

12. The invention of claim 1 further comprising a tractor operatively connected to a trailer by a hitch assembly, said strut operatively connected to said hitch assembly for cushioning relative bouncing movements occurring during operation of said tractor and trailer.

13. The invention of claim 12 wherein said trailer constitutes a scraper.

14. A tractor, a trailer and a hitch assembly operatively connecting said tractor and trailer together, said hitch assembly comprising at least two spaced and substantially parallel links each pivotally connected by a pair of shafts to said tractor and said scraper and a combined spring and shock-absorbing strut operatively connected between said links for cushioning bouncing movements occurring during operation of said tractor and trailer, said strut comprising a plurality of stacked resilient pads having predetermined individual and composite spring rates adapted to be alternately compressed and at least partially relaxed upon operation of said tractor and trailer and means operatively associated with said pads for compressing at least some of said pads when said strut is compressed by said links and for compressing at least some of said pads when said strut is tensioned by said links.

15. The invention of claim 14 wherein said trailer constitutes a scraper.

16. The invention of claim 14 wherein a first end of said strut is pivotally mounted on the shaft pivotally connecting said first link to said trailer and wherein a second end of said strut is pivotally mounted on the shaft pivotally connecting said second link to said tractor.

17. The invention of claim 14 wherein said strut further comprises a hollow casing, a rod coaxially and reciprocally mounted in said casing, said pads mounted on said rod to be selectively compressed and at least partially relaxed upon relative coaxial movements of said casing and rod in opposite directions, and wherein said means cooperates with said casing, rod and pads for effecting a first predetermined composite spring rate with said pads when said casing and rod are coaxially moved relative to each other in a first direction and for effecting a second predetermined composite spring rate with said pads when said casing and rod are coaxially moved relative to each other in a second direction opposite to said first direction.

18. The invention of claim 17 wherein said means cooperates with said casing, rod and pads to compress a greater number of said pads when said casing and rod are moved relative to each other in said first direction than when said casing and rod are moved relative to each other in said second direction.

19. The invention of claim 17 wherein said pads are constructed and arranged to exhibit a progressively variable spring rate when said casing and rod are moved relative to each other in at least said first direction.

20. The invention of claim 17 wherein said pads are normally partially compressed and preloaded a predetermined amount by said casing and said rod.

21. A combined spring and shock-absorbing strut comprising at least first and second groups of stacked resilient pads disposed on a common axis, means mounting said pads in said strut between spaced support members and means operatively associated with said pads for compressing and effecting a first predetermined composite support spring rate with at least said first group of said pads when said support members are moved towards each other and for compressing and effecting a second predetermined composite rebound spring rate with at least said second group of said pads when said support members are moved away from each other.